United States Patent [19]

Carothers et al.

[11] Patent Number: 4,663,692

[45] Date of Patent: May 5, 1987

[54] ELECTRICAL SURGE ARRESTER AND DISCONNECTOR

[75] Inventors: Charles H. Carothers, Longview, Tex.; Andrew S. Sweetana, Bloomington, Ind.

[73] Assignee: Westinghouse Electric Corp., Pittsburgh, Pa.

[21] Appl. No.: 749,337

[22] Filed: Jun. 27, 1985

[51] Int. Cl.[4] .............................................. H02H 3/22

[52] U.S. Cl. ..................................... 361/117; 361/123

[58] Field of Search ............... 361/117, 114, 115, 134, 361/135, 136, 123

[56] References Cited

U.S. PATENT DOCUMENTS

| | | | |
|---|---|---|---|
| 4,204,238 | 5/1980 | Stetson | 361/125 |
| 4,463,405 | 7/1984 | Koch et al. | 361/135 |
| 4,493,003 | 1/1985 | Mickelson et al. | 361/124 X |
| 4,503,414 | 3/1985 | Sykes et al. | 361/125 X |

*Primary Examiner*—A. D. Pellinen

*Assistant Examiner*—Derek S. Jennings

*Attorney, Agent, or Firm*—G. H. Telfer

[57] ABSTRACT

A disconnector for lightning arresters is provided that incorporates a gas cylinder with a dielectric gas such as carbon dioxide which will be released upon an excess current and result in the extinguishing of the arc in the disconnector spark gap prior to danger of shattering of the arrester housing.

4 Claims, 4 Drawing Figures

ELECTRICAL SURGE ARRESTER AND DISCONNECTOR

BACKGROUND AND SUMMARY OF THE INVENTION

This invention relates to explosive circuit opening devices, sometimes called disconnectors, for use with excess voltage protection devices such as surge arresters or lightning arresters.

Surge arresters have limits on their fault current conduction capability which if exceeded can result in a large pressure buildup in the porcelain arrester housing. The housing may shatter and, in some locations, endanger personnel and equipment.

An electrical disconnector is a known type of device used in association with surge arresters. The disconnector includes an explosive element that explodes on an excess fault current being conducted between the arrester and the ground terminal at the end of the disconnector. One form of known electrical disconnector is that described in Carothers et al U.S. Pat. No. 3,679,938, July 25, 1972, which includes an explosive cartridge, that is a metal shell containing an explosive material such as gun powder. Upon an excess current the cartridge explodes and ruptures the disconnector housing to remove the ground terminal from the arrester. Such a disconnector terminates the fault current but may not do so without having the arrester housing shatter as well.

The present invention relates to a new disconnector device particularly for distribution class lightning arresters which are relatively small size, high volume products that must be economically manufacturable. A drawback of the known prior art that uses explosive charges is that they are not self-clearing devices but instead they require the operation of some other device on the source side of the system such as a fuse cutout, recloser, or breaker to actually clear the fault that results in the operation of the disconnector. This is the case because the gunpowder of the explosive cartridge creates a highly conductive path of ionized gas. The ionized gas may continue the fault current conduction for a period even after operation of the disconnector with an arc stretching up to about one meter or more. This phenomenon can still result in the explosive fracture of the arrester porcelain housing which is highly objectionable. A period of continued fault current conduction of about 5 to 12 cycles can occur depending on where the failed arrester is located in the system. The fault current could be 10,000 amperes or more. Thus the object of avoiding shattering of arresters has not been attained by the prior art except in instances in which stronger, shatter resistant arrester housings are used at a substantial cost increase.

The present invention is directed to a more positive solution to the shattering porcelain problem. A disconnector in accordance with the invention comprises a cylinder containing compressed gas as the key element to the success of this new design and in place of the explosive cartridge of the prior art disconnectors. The gas cylinder is in the conductive path from the arrester components to the ground terminal. In one embodiment it has a seal that defines the breaking point of the gas cylinder which upon a certain excess fault current will release $CO_2$, or other dielectric gas, into the disconnector cup. The pressure increases in the cup causing it to fracture and physically force the ground cable away from the arrester. Just prior to this, however, the buildup of dielectric gas pressure inside the disconnector cup serves another more important function in forcing the arc of the fault current conduction, that is the arc through the spark gap in the disconnector, to be extinguished. This means there can be much greater assurance of protection of the porcelain arrester housing against shattering. It also means that the functions required by protective devices elsewhere on the system such as breakers, reclosers or fuse cutouts can be reduced.

DESCRIPTION OF THE PREFERRED EMBODIMENTS

Figure 1A:
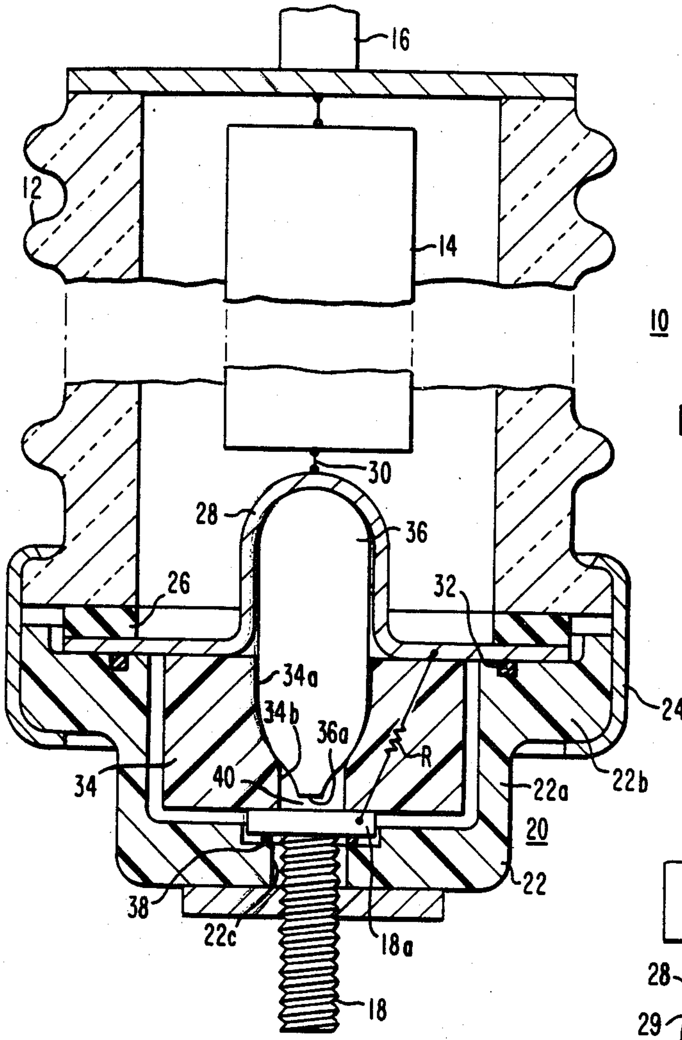
FIGS. 1A and 1B show sectional views of an arrester and disconnector in accordance with embodiments of the present invention.

Referring to FIG. 1, an arrester 10 is shown that includes a fracturable housing 12 such as of porcelain which contains an assemblage of arrester components 14 including, for example, valve blocks and spark gaps or metal oxide discs in accordance with known practice located between a line terminal 16 and a ground terminal 18. A disconnector device 20 is disposed in association with the arrester 10 between the arrester components 14 and the ground terminal 18.

The disconnector 20 includes a disconnector cup 22 which is of a fracturable insulating material for which plastic materials such as melamine are suitable as well as other materials. A portion **22*a* of the cup 22 is a relatively thin wall that locates where the cup will fracture. The disconnector cup 22 has a rim 22*b* sealed to the lower extremity of the porcelain housing 12 of the arrester 10. In this embodiment there is a metal flange 24 that extends around and secures the arrester housing 12 and the disconnector cup rim 22*b*. There is also a bottom seal gasket 26 in the form of a ring disposed between the housing members 12 and 22 and a metal seal plate 28 that extends across the end of arrester enclosure 12 and has an electrical connection 30 with the arrester components 14. An O-ring seal 32 or the like is disposed between the seal plate 28 and the disconnector cup rim 22*b***.

Within the disconnector cup there is an insulating support and gap spacer 34 of insulating material such as the same material used for the disconnector cup. The insulating support 34 has a central recess **34*a* and aperture 34*b*. The recess 34*a* supports a metal walled gas cylinder 36, containing a dielectric gas such as $CO_2$. The upper end of gas cylinder 36 is located within a recess of the metal seal plate 28** and has a conductive pressure engagement therewith.

The ground terminal 18, in the form of a threaded stud, is located through an aperture **22*c* of the disconnector cup 22 and has a head 18*a* in sealed relationship thereto as by the O-ring seal 38 shown. Between the head 18*a* of the ground stud 18 and the end 36*a* of the gas cylinder 36 there is a spark gap 40** with those two elements serving as electrodes thereof. The end portion 36*a* of the gas cylinder adjacent the spark gap 40 is the seal point of the gas cylinder 36 providing a tip serving as a good spark gap electrode and also reliably releasing the gas directly into the spark gap upon a predetermined pressure buildup of that gas.

A resistor R is connected between seal plate 28 and ground terminal head 18*a*, electrically in parallel with spark gap 40. Resistor R conducts leakage current during steady state operation. For higher impulse or short circuit currents the voltage (I×R) across the parallel combination of resistor R and spark gap 40 builds to a level sufficient to cause spark gap 40 to sparkover. Resistor R may take various forms, such as the one shown for the flexible grading resistor of above-mentioned U.S. Pat. No. 3,679,938.

In operation, when the arrester 10 operates normally, fault current is conducted through the arrester components 14, the metal seal plate 28, the wall of the gas cylinder 36, the spark gap 40, to the ground stud 18. Such operation inherently causes a gas pressure buildup in the housing 12 which can be safely sustained up to a limit. Before the gas pressure reaches a level which endangers the structural integrity of the housing 12, the dielectric gas pressure in the gas cylinder 36 exceeds its limit causing release of the dielectric gas therein. Preferably this occurs at the cylinder seal 36*a* immediately adjacent the spark gap so that conduction of the spark gap is almost immediately extinguished, either before, with or immediately after the $CO_2$ gas pressure fractures the disconnector cup 22 to separate the ground terminal 18 from the unit.

Figure 1B:
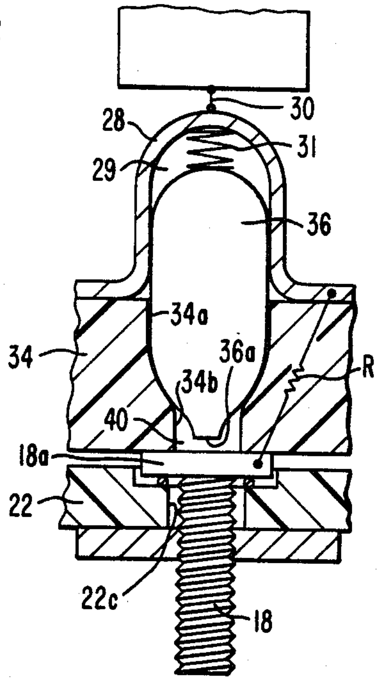

A modified version of the device is shown in FIG. 1B that has advantages over that of FIG. 1A. In FIG. 1B, the gas cylinder 36 is sized in relation to the seal plate 28 and the spacer 34 so there is a space 29 between the gas cylinder and the seal plate. The space 29 accommodates a spring 31 that is in compression between plate 28 and cylinder 36. The cylinder 36 rests on cup 22 as in FIG. 1A. Spring 31 is electrically conductive and connects the parts 28 and 36. The coiled spring 31 shown is illustrative of the use of a spring although other forms of spring, and other forms of maintaining a conductive path between parts 28 and 36, may be used.

One advantage of the embodiment of FIG. 1B is that the spring 31 much reduces the need for close tolerances in the dimensions of plate 28, cylinder 36 and spacer 34, when while assuring good electrical contact. Another advantage is that under fault current conditions, the rupture of cylinder 36 at the seal 36*a* causes gas to be expelled, the cylinder 36 lifts and compresses the spring 31. This results in a lengthening of the arc in spark gap 40. The lengthening of the spark gap 40 makes the extinguishing of an arc in the gap 40 easier.

Figure 2:
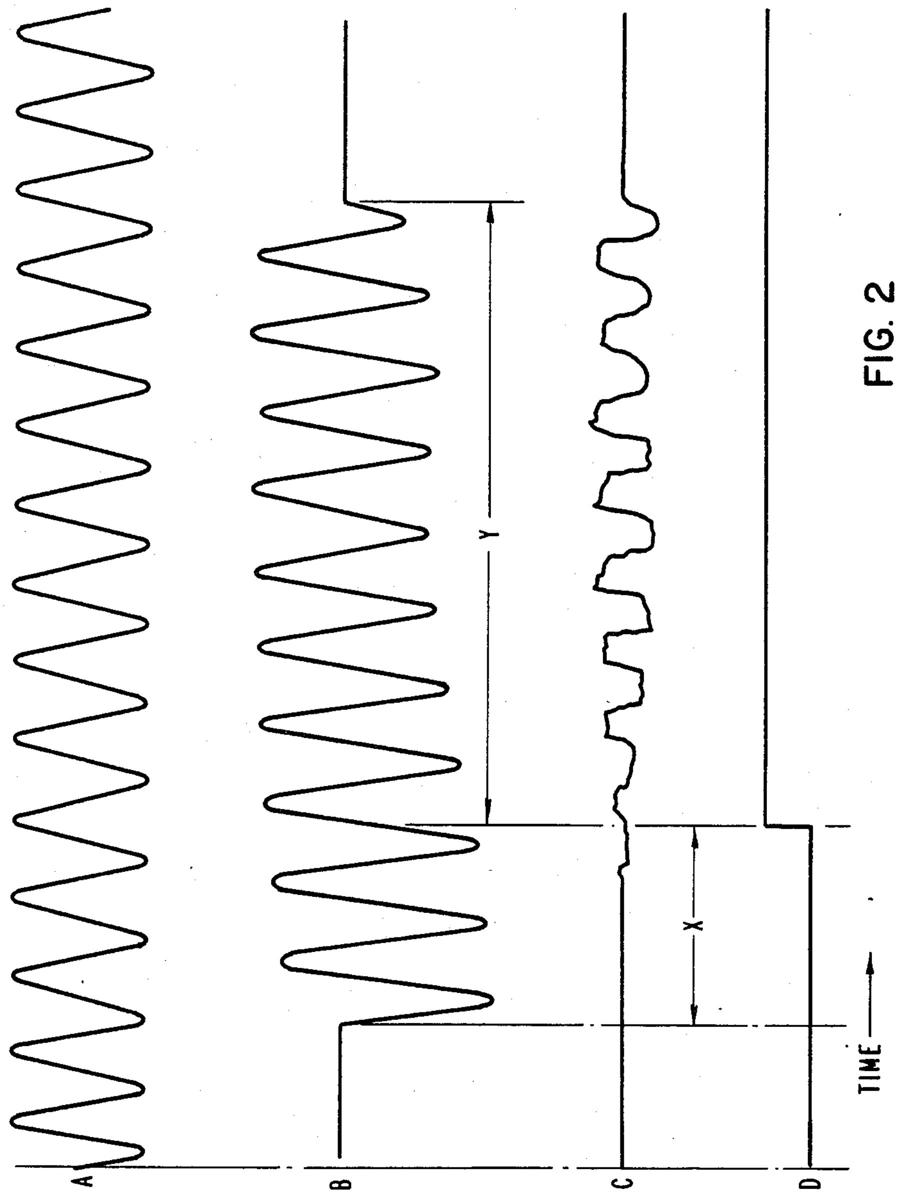
FIG. 2 shows waveforms illustrating performance of a prior art disconnector device with an explosive cartridge.
Figure 3:
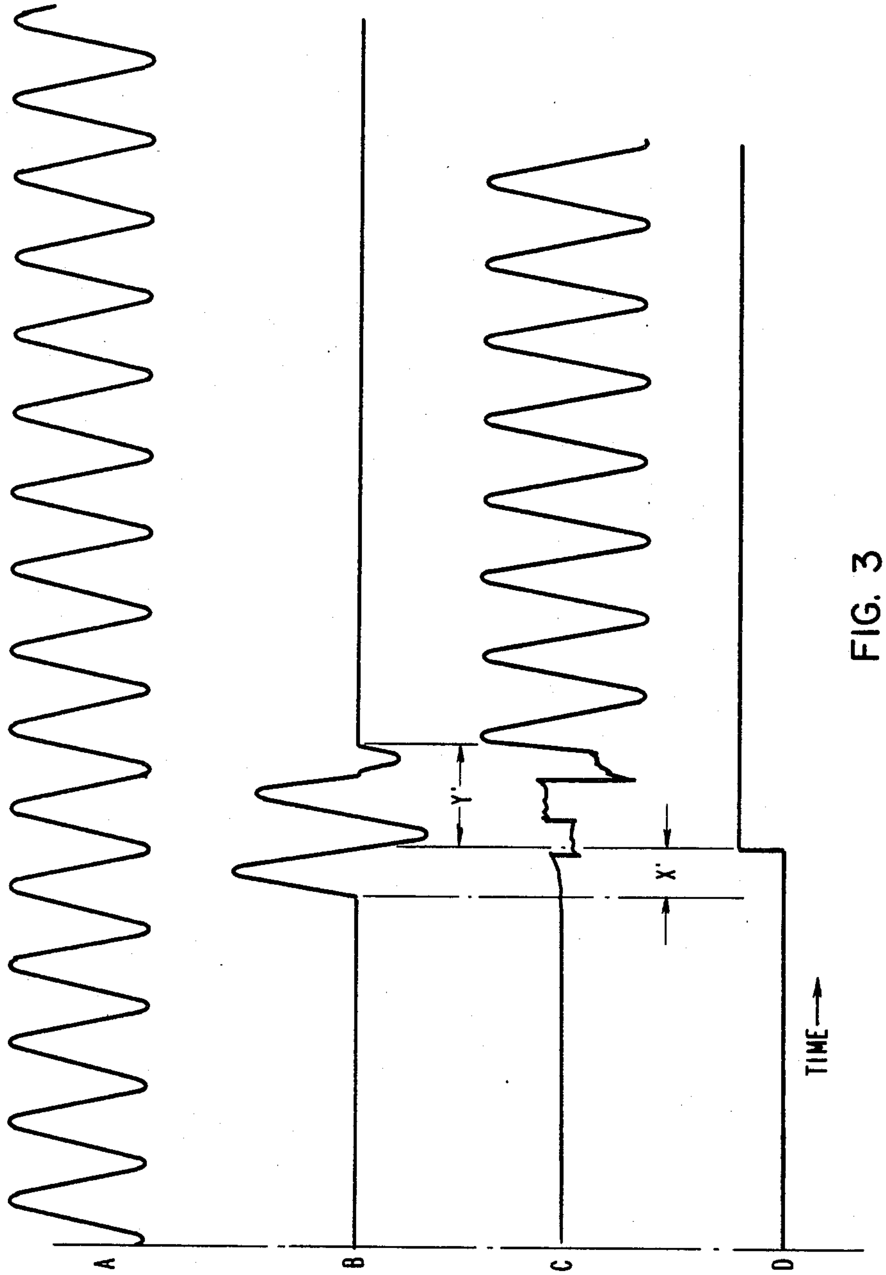
FIG. 3 shows waveforms illustrating performance of a device in accordance with the present invention with the disconnector having a gas cylinder.

The operation of the device is illustrated by the curves of FIGS. 2 and 3. In FIG. 2 results are shown with a prior art disconnector in accordance with the aforementioned patent that includes an explosive cartridge of a 0.290 brass sleeve (22 caliber cartridge). Curve A shows the waveform of the A.C. source voltage which in the test conducted was equal to 2400 volts rms. Curve B shows the waveform of the A.C. short circuit which in the test conducted was a fault current that reached the magnitude of 1114 amperes rms. Curve C shows the arc voltage in the spark gap of the disconnector. Curve D shows a DC voltage trace established to indicate the breaking of the disconnector cup in this laboratory test. The curves show that over a duration X of about $2\frac{1}{2}$ cycles short circuit conduction occurred before the disconnector cup broke (at the step in curve D). After the disconnector cup broke the current conduction (B) and arc voltage (C) continued for a duration Y of about 8 cycles before the circuit was manually opened by a technician. This illustrates that during that appreciable period and longer there can be continuing buildup of pressure within the porcelain housing of the arrester that could result in its rupture.

In FIG. 3 similar curves are shown in parts A, B, C and D for an embodiment of the present invention in accordance with FIG. 1B. The source voltage of curve A is the same as in FIG. 3. In curve B the short circuit current is shown which had a similar value of 1114 amperes rms with a total current flow of only about two cycles, and, as shown in curve D, there was a duration X′ of only $\frac{3}{4}$ of one cycle before the disconnector cup 22 broke. The arc voltage is shown to be continued for a duration Y′ of only another $1\frac{1}{4}$ cycles. After the current was interrupted, the arc extinguished, the dropout fell away and full voltage appeared at which time the technician manually opened the circuit. It is thus shown that with the invention the current is interrupted and the arc is extinguished almost immediately without having to wait for some source side protective device to operate. Thus, less energy is put into the arrester housing 12 and the probability of shattering is greatly reduced. Also, when the disconnector 20 clears the fault itself, wear and tear on the system and its protective equipment is reduced. In some instances during lab tests, the fault current was extinguished even before the disconnector cup 22 ruptured. The cup 22 subsequently ruptured as pressure continued to increase due to release of gas from cylinder 36, thus serving to give a visible indication the arrester has failed.

It is thus shown that a marked improvement in disconnector operation can be provided for greater assurance against arrester housing shattering by the utilization of a gas cylinder that releases the gas that extinguishes the arc that is otherwise supported and maintained by the ionized gas of the prior art explosive cartridge disconnectors.

It will be apparent that the physical arrangement of the elements of the invention may vary from that shown and described herein in accordance with the general teachings of this invention.

We claim:

1. An electrical surge arrester and disconnector device comprising:

an insulating arrester housing subject to fracture in the event of an excess pressure buildup therein to a first level;

a stack of surge arrester elements located within said arrester housing;

a line terminal connected to one end of said stack and extending from said arrester housing;

a disconnector cup of insulating material, said cup being subject to fracture at a portion thereof in the event of a pressure buildup therein to a second level that is less than said first level;

said disconnector cup having a rim disposed in sealed relation to an end of said arrester housing proximate an end of said stack of surge arrester elements that is remote from said line terminal;

said disconnector cup having an aperture through which a ground terminal stud extends, said ground terminal stud having a head portion located interiorly of said disconnector cup;

a gas cylinder located with a first portion in conductive engagement with said end of said stack and a second portion proximate said head portion of said ground terminal stud with a spark gap defined therebetween;

said gas cylinder comprising a sealed metal walled vessel containing a dielectric gas in an amount sufficient to cause rupture of said metal walled vessel by rise in its pressure when a predetermined fault current is conducted through said vessel that in turn results in pressure rise in said disconnector cup to said second level to fracture said cup while avoiding fracture of said arrester housing and rapidly causing extinguishment of any arc produced by said fault current.

2. An electrical surge arrester and disconnector device in accordance with claim 1 wherein:

said sealed metal walled vessel is a substantially smooth surfaced bulb type element with a tapered seal at said second portion adjacent said spark gap;

a metal seal plate is disposed between said first portion of said gas cylinder and said arrester stack, said metal seal plate having a rim portion sealed between said end of said arrester housing and said rim of said disconnector cup and also having a central bulge portion extending toward said arrester stack with the interior of said bulge portion accommodating said first portion of said gas cylinder in conductive relation therewith;

an insulating support and spacer element is located within said cup and has a central aperture accommodating and supporting said second portion of said gas cylinder and exposing said tapered seal of said gas cylinder to said spark gap.

3. An electrical surge arrester and disconnector device in accordance with claim 1 further comprising:

spring means between said end of said stack and said gas cylinder for permitting said gas cylinder, upon rupture, to move away from said terminal stud and lengthen said spark gap for facilitating the extinguishment of any arc therein.

4. An electrical surge arrester and disconnector device in accordance with claim 1 wherein:

said gas cylinder has a tapered seal at said second portion adjacent said spark gap;

a metal seal plate is disposed between said first portion of said gas cylinder and said arrester stack, said metal seal plate having a rim portion sealed between said end of said arrester housing and said rim of said disconnector cup and also having a central bulge portion extending toward said arrester stack with the interior of said bulge portion accommodating said first portion of said gas cylinder in conductive relation;

spring means are disposed between said metal seal plate and said gas cylinder;

an insulating support and spacer element is located within said cup and has a central aperture in which said second portion of said gas cylinder is accommodated while said tapered seal is exposed to said spark gap, so as to provide an arrangement in which the rupture of, and release of gas from, said gas cylinder at said tapered seal forces said gas cylinder against said spring, thus moving said gas cylinder away from said ground terminal stud to lengthen said spark gap and to expedite extinguishing an arc in said spark gap.

* * * * *